Oct. 21, 1952      L. GREENIDGE      2,614,324
CARROT CUTTER
Filed April 12, 1949
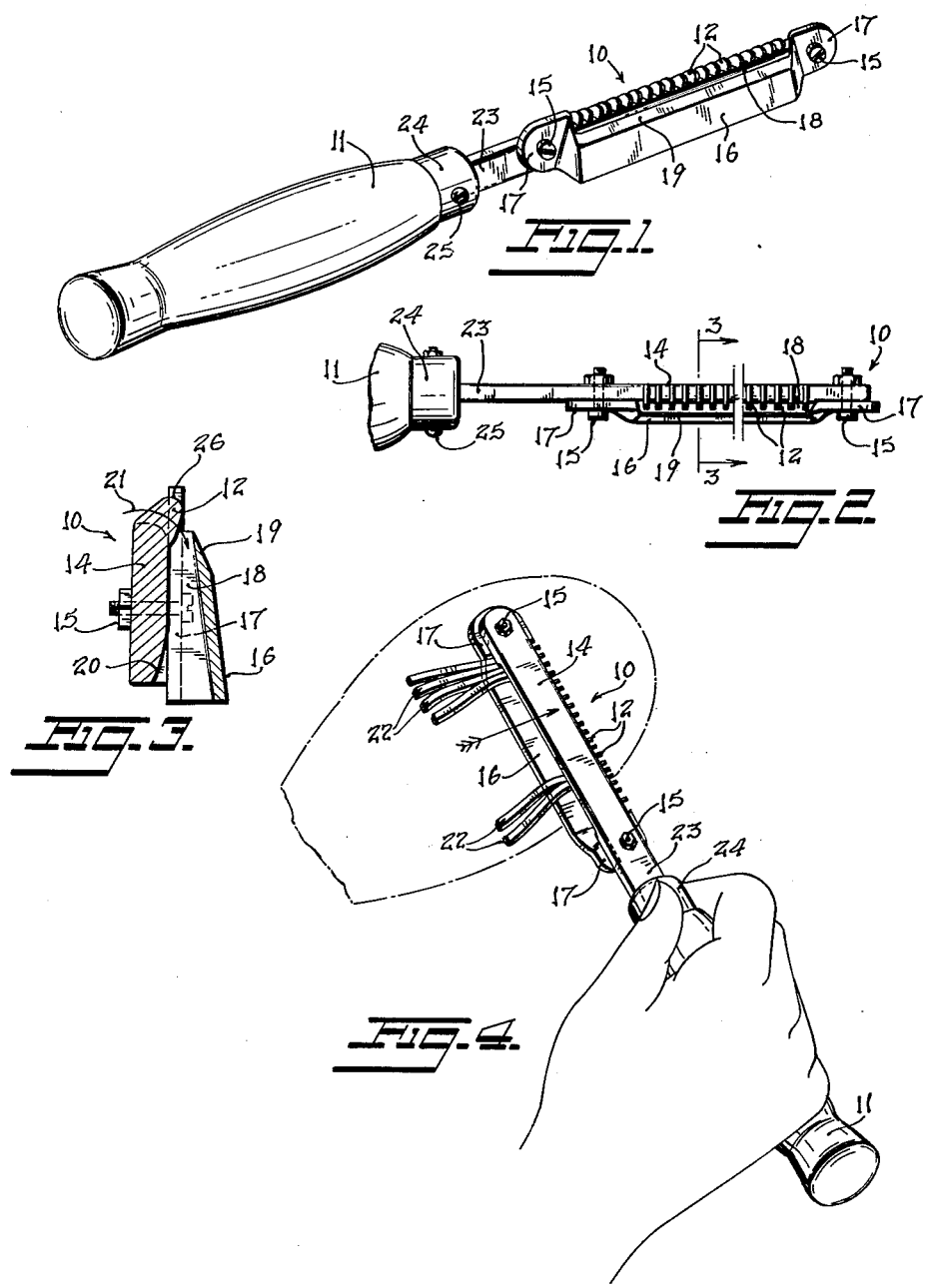
INVENTOR.
LUIS GREENIDGE
BY
*Jottan Polachek*
ATTORNEY

Patented Oct. 21, 1952

2,614,324

UNITED STATES PATENT OFFICE 2,614,324

CARROT CUTTER

Luis Greenidge, New York, N. Y.

Application April 12, 1949, Serial No. 86,907

1 Claim. (Cl. 30—279)

This invention relates to new and useful improvements in culinary utensils, and, more particularly, the aim is to provide a novel and valuable such utensil, characterized by a unique cutting structure especially efficacious for quickly and easily subdividing a food body, such, for instance, as a carrot, beet or analogous article, into strand or thread-like and generally slender pieces, and when desired into very long pieces; as for preparing salads or other viands.

A feature of the invention is that, with the new utensil adapted to be given at its cutting end a single sweeping stroke across the food body to be subdivided and with the direction of advance of said stroke at right angles to the direction of length of the cutting end, and with the utensil completed by an elongate handle offset from one end of the cutting end in the direction of length of the latter for grasp by one hand of the worker, even an unskilled worker may expeditiously apply one or more such strokes to a carrot, beet or the like held in the worker's other hand; the cutting means present on the cutting end being so constituted and so relatively arranged that any such stroke requires but little effort, although at each stroke a multiplicity of said pieces may be cut off.

A further feature of the invention is the provision of a utensil as above, which has its cutting elements so carried thereby that said working stroke is most conveniently performed in a direction away from the worker, since that mode of operation has been found to be to a marked extent the best and quickest way to do the work.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view illustrating the new utensil in a now favored embodiment thereof.

Fig. 2 is a fragmentary top plan view of said utensil, showing in its entirety the working portion of the utensil and the handle being only partially shown.

Fig. 3 is an enlarged detail view, this being a transverse section taken on the line 3—3 of Fig. 2.

Fig. 4 is a perspective view illustrating said utensil in use relative to, say, a raw carrot, with the butt end portion of the latter indicated in outline in dot and dash lines.

The carrot cutter, according to the present invention, includes a cutting end 10 and an elongated handle 11.

The grooving blades, these marked 12, extended in line as shown, are all alike, and each is of the outline best depicted in Fig. 3; all these blades 12 being formed on a main bar 14, in the positions relative thereto illustrated. It will be observed that each blade 12 may, with more or less aptness, be described as substantially L-shaped; as has already been mentioned.

Said blades 12 may be separately made and later inset at their root portions in the bar 14; but it is quite practicable and involving merely a fabrication method of small cost to have them integral with said bar. That is to say, once the bar 14 is stamped from a suitable metal stock to the over-all cross-sectional outline shown in Fig. 3, a single application of a suitable gang-type milling cutter or planer or shaper tool would suffice to establish all the blades 12.

The cutting end 10 of the utensil incorporates, a pair of coupling agents 15, 15, each of these shown as consisting of a small bolt and an attending nut (as for facilitating ready substitution, if desired, of a bar corresponding to the bar 14 except for differently spaced grooving blades and/or of different cutting-depth capacities as between the blades of one bar and those of another), and an auxiliary and preferably thinner bar member 16. This bar 16 is more strip-like than bar-like, and below will be called the strip 16.

Said strip 16 is, as illustrated, shaped near its opposite ends to provide end leaves 17, 17 flatwise and mutually aligned to lie flat against the end portions of the bar 14. The strip 16 cooperates with the bar 14 to provide a passageway 18. The passageway 18 is as long as the line of grooving blades 12, and even at its entrance opening, this being adjacent to said blades 12, is of a height roughly commensurate with the thickness of the strip 16.

This height is predeterminedly related to the maximum dimension of a blade 12 above the top of the bar 14 and taken vertically in Fig. 3. Such height need not be, as is indicated in said Fig. 3, as great as said blade dimension, due to a noted behavior of the cut-off ribbon-like pieces of the carrot, beet or the like, after such pieces are established by the passage, intersectingly of all groove bottoms in said carrot, beet or the like, of a blades-12-follower instrumentality, this last the slice-off knife already mentioned.

Said slice-off knife is shown at 19, and as constituted by a lengthwise portion of the strip 16, located along the leading edge of the latter, and beveled off and sharpened to a razor-keen edge.

It is to be noted, as already mentioned, that the last-named edge, as long as the line of blades 12, is rearwardly offset from the parts of the blades 12 projected to the right of the bar 14 in Fig. 3, and hence is a follower instrumentality relative to said blades 12 when the utensil is applied to give its working stroke relative to the carrot, beet or the like, as indicated in Fig. 4 when taken in connection with the arrow there shown, this pointed in the direction of said stroke.

As will best be noted from Fig. 3, the passageway or tunnel 18 in a direction opposite to that of the arrow just referred to, gradually flares to increase in height, this partially resulting from the oblique inclination of the central portion of the strip 16 and partially resulting from a bevelling off, as at 20, of that side of the bar 14 which during said working stroke is lowermost on said bar.

Adverting to the above mentioned behavior of the cut-off ribbon-like pieces of the carrot, beet or the like (this statement in the second paragraph preceding), such behavior, which is a curling of each such piece around the bar 14 as indicated by the arrow 21 in Fig. 3, is evidently the result of the slicing action of the knife 19. Thus the cut pieces enter the passageway 18, at the upper end of the latter in Fig. 3, and pass from the passageway 18 at the rear thereof as shown at 22 in Fig. 4.

Beyond the line of blades 12, the bar 14 is extended and in any suitable way secured to the handle 11; such extension, as shown in Fig. 1, being in the form of a tang 23 fitted into a suitable recess in the handle and there secured as by the aid of a ferrule 24 and a screw (or rivet) 25.

Whenever herein the crest of a grooving cutter is referred to, there is meant that point along its cutting edge, as the point marked 26 in Fig. 3, which is most remote from the bar 14 along a distance in or parallel to the general plane of the flat of said member.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a knife, an elongated bar having a gripping handle at one end thereof, a set of spaced grooving blades integral with said bar and projected at right angles from one side and an adjacent longitudinal edge of said bar intermediate the ends thereof, a metal strip having an intermediate portion extended parallel to and spaced from the said one side of said bar from which said grooving blades extend, said intermediate portion of said strip being of a length corresponding to the length of the set of grooving blades and having at the ends thereof offset end portions secured flatwise to the said one side of said bar beyond the ends of the set of grooving blades, and a knife edge formed along the edge of the intermediate portion of said metal strip located adjacent said grooving blades, said metal strip having its intermediate portion spaced in its width from its knife edge to its other edge progressively further away from said bar, said bar at its edge opposed to its edge from which said grooving blades extend having its side facing said metal strip bevelled away from said metal strip, so constructed and arranged that said bar and said metal strip form a discharge passageway which increases in width away from said grooving blades.

LUIS GREENIDGE.

REFERENCES CITED

The following references are of record in the file of this patent:

UNITED STATES PATENTS

| Number | Name | Date |
| --- | --- | --- |
| D. 47,697 | Korpa | Aug. 10, 1915 |
| 425,065 | Duchemin | Apr. 8, 1890 |
| 1,778,161 | Miller | Oct. 14, 1930 |
| 2,458,090 | Miller | Jan. 4, 1949 |